Dec. 20, 1955   R. W. WONDERS   2,727,313
COLLOCATING MEANS FOR MEASURING RADII
Filed April 15, 1950
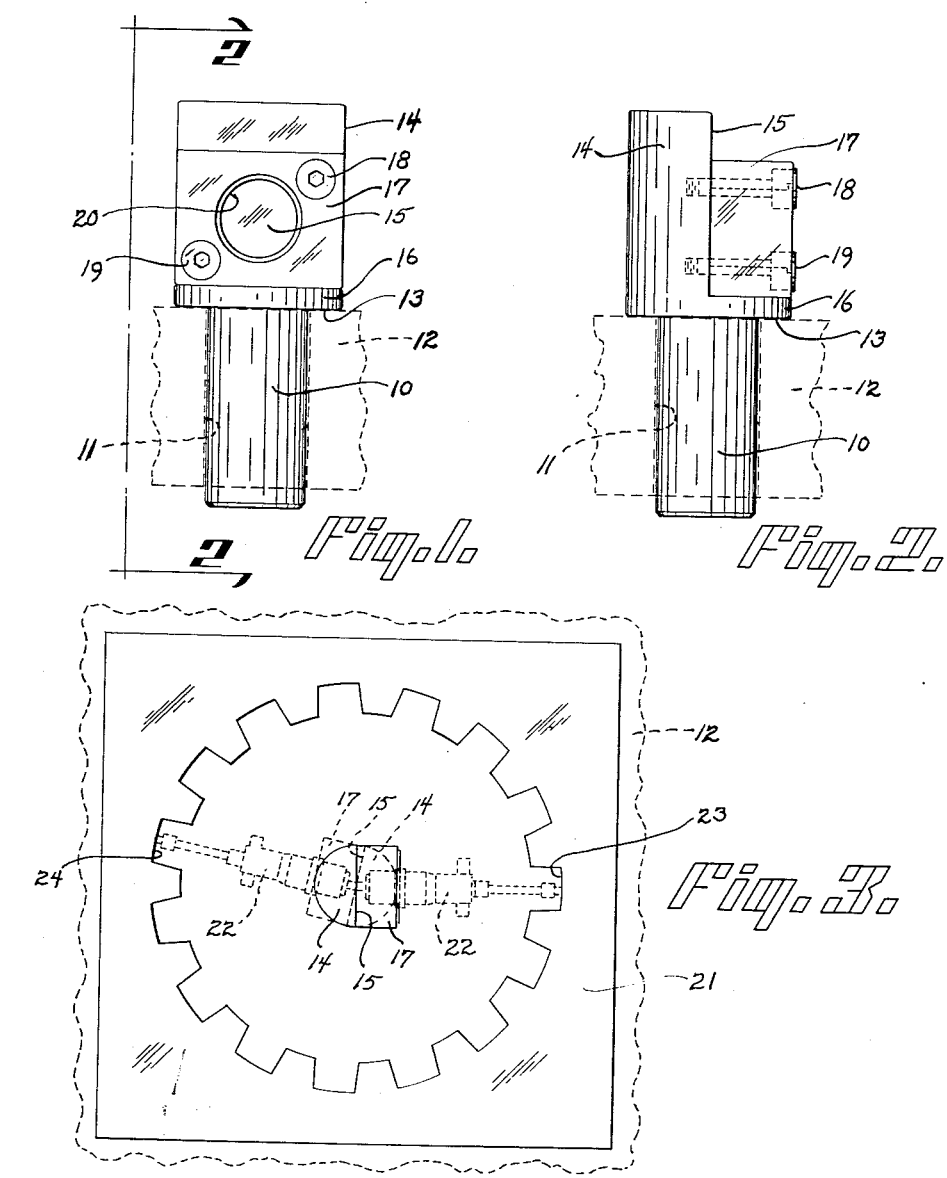
Inventor
Roland W. Wonders
by M. Talbert Dick
Attorney
Witness
Merle A. Bjork

United States Patent Office 2,727,313
Patented Dec. 20, 1955

2,727,313

COLLOCATING MEANS FOR MEASURING RADII

Roland W. Wonders, Des Moines, Iowa

Application April 15, 1950, Serial No. 156,153

7 Claims. (Cl. 33—185)

My invention relates to the art of taking radial measurements on pieces being formed on machines having a true center axis. Specifically I have invented a method and a means for making these measurements with standard instruments by supplying a tool or holder for the measuring instrument that supports it with one end of its measuring element at the true center axis of the machine and the other at a point on a radially extending line from said true center axis.

As typical of the problem for which I offer a unique solution, let us consider the measurement of the depth of a cut to form a tooth on a female, gear trimming die for a gear having an odd number of teeth. In the making of such a gear die, the stock is first bored to the size of the gear body at the base of the teeth. It is then necessary to make a series of cuts extending radially and generally in the form of a truncated acute isosceles triangle at any given plane in the height of the cut as illustrated in Fig. 3. These cuts are spaced evenly around the original boring and to an equal depth. Because they are odd in number, however, no two of them will be diametrically opposed to each other. The machine on which the cutting is done may be a very good one and the calibrations on the controls of the machine indicating the depth of cut taken may be accurate within the allowable tolerances called for by the work. It is usually considered desirable, nevertheless, to check the work with precision measuring instruments. In this case it would be by using an inside micrometer. Until now the method of making these measurements has been relatively crude and placed on the operator an extraordinary demand for skill and care. Since there was no known good method of measuring the radii directly, the procedure was to measure the diameter which, of course, was not entirely accurate since there was no guarantee that the diameter measurement, even if correct, extended an equal distance to either side of the center. In addition it was necessary to make an arithmetical calculation since the larger diameter could not be measured directly. Because no two teeth cuts were exactly opposite each other, a measurement across the gear was taken from the side of the gear body cut, i. e., the first boring, to the cut made for a tooth. It was then necessary to add the depth of a second tooth cut to this direct measurement to arrive at a diameter figure. This extra arithmetical step provided another opportunity for error. In combination with the inherent error of attempting to measure radii by checking diameter and halving the figure so obtained, the extra chance for error in adding the amount of a hypothetical tooth cut made this old system somewhat unreliable especially in view of the precision normally anticipated in performing this kind of work. The example here described in some detail may be multiplied many times over on all kinds of circular work on machines having what is known as a true center axis such as lathes, drill presses, vertical shapers, and many others. Also it will be seen that my method and means for measuring radii simplifies the making of other radii measurements as well as solving the particularly vexing problem presented here.

In view of the foregoing discussion it is the principal object of my invention to provide a method of taking direct measurements of radii on work being processed on machines having a true center axis and well. It is a further object of my invention to provide a means for executing my method of taking radii measurements with standard precision instruments on work being processed on machines equipped with a true center well on the work-holding portion of the machine.

It is a further object of my invention to provide a method for making direct measurements of radii on work being processed on machines having a true center axis that requires a measuring instrument holder that is economical of manufacture and durable in use.

These and other objects will be apparent to those skilled in the art.

My invention consists in the method and in the means having its parts arranged and constructed to achieve my invention as hereinafter more fully set forth, pointed out in my claims, and illustrated in the accompanying drawings, in which:

Fig. 1 is a front view of my measuring instrument holder with broken lines showing a fragment of a work supporting surface of a machine having a true center well and showing how the holder fits down in the well.

Fig. 2 is a side view of my instrument holder with broken lines showing a fragment of a work holding table as in Fig. 1 and also showing the screw means for securing the holding block to the reference face.

Fig. 3 is a top view of my device to illustrate the method of using it to make radii measurements, with broken lines showing an inside micrometer in two positions and a fragment of a work holding table.

Referring to the drawings the numeral 10 designates the straight sided stub shaft that slideably fits a true center well 11 of the work holding member 12 of machine tool. A shoulder designated 13 is machined just above the shaft. At one side the tool extends straight upwardly to form the reference block 14 presenting a plane surface 15 that is on the center line of the stub shaft at its base and extends upwardly so that a continuation of the center line of the stub shaft would lie within plane surface 15. The shoulder 13 at the side opposite to that of reference block 14 is cut away in the form of a shelf 16 to expose plane surface 15. This shelf is preferably at right angles to surface 15 so that the holding block 17 may be more easily fitted to surface 15. Holding block 17 is secured to surface 15 in any suitable manner and preferably detachably so secured as by screws 18 and 19 threading into appropriately threaded holes in block 14. Block 17 has an appropriate aperture 20 machined in it. This hole or aperture 20 is so arranged with respect to block 17 that its longitudinal axis is perpendicular to surface 15 and would intersect the center line of stub shaft 10. In Fig. 3 a female die 21 is shown secured to the work holding member 12 of a machine tool and my invention mounted in the true center well thereof. An inside micrometer 22 is shown held in two different positions measuring radii directly to the tooth cuts 23 and 24 respectively which it will be noted are not directly across from each other and could not, therefore, be easily measured with any real accuracy by measuring a diameter. It will be noted that one end of the micrometer extends to the plane surface 15 so that it is at the exact center axis of the work table and, therefore, measures true radii. While I have shown my holder used with an inside micrometer, the measuring instrument could also be readily adapted to take outside measurements as well. The holding block 17 that slideably receives the measuring instrument 22 in aperture 20 is preferably removable to permit the use of other holding blocks to permit my invention to be adapted to any standard measuring instrument. It will be understood, of course, that any type of machine having a true center well is one with which my tool may be profitably used. It is also necessary to realize that while I have shown the holder in use to measure work accomplished, it may also be used to lay out work in the planning stage.

Some changes may be made in the construction and arrangement of my method and means for measuring radii without departing from the real spirit and purpose of my invention, and it is my intention to cover by my claims, any modified forms of structure or use of mechanical equivalents which may be reasonably included within their scope.

I claim:

1. In combination with a machine having a true center well, a radii measuring reference point tool comprising; a member designed to slideably and rotatably fit said true center well and having a plane surface one line of which coincides with a corresponding length of a straight extension of the longitudinal axis of said true center well, and a block having a hole therein secured to said plane surface so that the longitudinal axis of said hole is perpendicular to said plane surface and intersects a straight extension of the longitudinal axis of said true center well.

2. In a radii measuring center reference tool in combination with a machine having a true center axis, a first block member presenting a plane surface, a means for supporting said block in reference to the true center of a machine so that a line of said plane surface coincides with a corresponding length of a straight extension of said true center axis, and a second block having a hole therein fixed in relation to said first block so that the longitudinal axis of said hole in said second block is perpendicular to said plane surface and intersects the line of said plane that may be arranged to coincide with a portion of a straight extension of the true center axis of a machine.

3. In a radii measuring reference point tool in combination used with a linear measuring instrument and a machine having a true center axis, a block having a plane surface, a means for rotatably supporting said block so that a line of its plane surface coincides with a corresponding length of a straight extension of said true center axis, and a means for holding the measuring portion of a linear measuring instrument perpendicular to said plane surface and touching the line of said plane surface that coincides with a portion of said extension of said true center axis.

4. In a radii measuring reference point tool in combination used with a linear measuring instrument and a machine having a true center axis, a block member capable of being detachably secured to a machine having a true center axis so that a straight continuation of the true center axis of the machine would lie within its bulk; said block having a plane bottomed well therein extending solely to said continuation of a true center axis of a machine and capable of receiving and holding a linear measuring instrument with one end of its length measuring portion abutting the plane bottom of said well and its length extending radially therefrom.

5. In combination with a machine having a true center well, a radii measuring reference point tool comprising; a member designed to slideably fit said true center well and having a plane surface one line of which coincides with a corresponding length of a straight extension of the longitudinal axis of said true center well, and a block having a hole therein detachably secured to said plane surface so that the longitudinal axis of said hole is perpendicular to said plane surface and intersects a straight extension of the longitudinal axis of said true center well.

6. In a radii measuring center reference tool in combination with a machine having a true center axis, a first block member presenting a plane surface, a means for supporting said block in reference to the true center of a machine so that a line of said plane surface coincides with a corresponding length of a straight extension of said true center axis, and a second block having a hole therein detachably fixed in relation to said first block so that the longitudinal axis of said hole in said second block is perpendicular to said plane surface and intersects the line of said plane that may be arranged to coincide with a portion of a straight extension of the true center axis of a machine.

7. In a radii measuring reference point tool in combination with a machine having a true center well therein, a reference point block having a stub shaft formed thereon adapted to slidably and rotatably fit the true center well of a machine; said reference point block having a reference point portion thereon coinciding with an extension of the longitudinal axis of the stub shaft of said reference point block, and a means secured to said reference point block for holding a linear measuring device with one end of its measuring means coinciding with the reference point of said reference point block; whereby lineal radial measurements are made from the true center axis of a machine to points surrounding the true center axis of a machine.

References Cited in the file of this patent

UNITED STATES PATENTS

| 451,053 | Jackman | Apr. 18, 1891 |
| 672,213 | Holcomb | Apr. 16, 1901 |
| 2,173,519 | Jones | Sept. 19, 1939 |
| 2,348,712 | Dahlerup | May 16, 1944 |
| 2,369,425 | Becker | Feb. 13, 1945 |
| 2,419,134 | Hall | Apr. 15, 1947 |
| 2,551,242 | Burwinkle | May 1, 1951 |
| 2,621,416 | Brenneke | Dec. 16, 1952 |

FOREIGN PATENTS

| 13,703 | Great Britain | Oct. 10, 1887 |